United States Patent
Rueckert

(10) Patent No.: US 11,039,427 B2
(45) Date of Patent: Jun. 15, 2021

(54) METHOD FOR DEACTIVATING CONTROL CHANNELS AND COMMUNICATION SYSTEM FOR THE COMMUNICATION OF A USER WITH GROUPS OF TARGET DEVICES

(71) Applicant: Tobias Rueckert, Winterbach (DE)

(72) Inventor: Tobias Rueckert, Winterbach (DE)

(*) Notice: Subject to any disclaimer, the term of this patent is extended or adjusted under 35 U.S.C. 154(b) by 0 days.

(21) Appl. No.: 16/794,464

(22) Filed: Feb. 19, 2020

(65) Prior Publication Data
US 2020/0187187 A1 Jun. 11, 2020

Related U.S. Application Data

(63) Continuation-in-part of application No. PCT/EP2018/071412, filed on Aug. 7, 2018.

(30) Foreign Application Priority Data

Aug. 27, 2017 (DE) ...................... 10 2017 008 051.8

(51) Int. Cl.
*H04W 72/04* (2009.01)
*H04W 12/06* (2021.01)

(52) U.S. Cl.
CPC ....... *H04W 72/0406* (2013.01); *H04W 12/06* (2013.01)

(58) Field of Classification Search
CPC ............ H04L 41/0803; H04L 12/2816; H04L 12/281; H04L 12/4625; H04L 41/16;
(Continued)

(56) References Cited

U.S. PATENT DOCUMENTS

2014/0214994 A1 7/2014 Rueckert et al.
2015/0006695 A1 1/2015 Gupta
(Continued)

FOREIGN PATENT DOCUMENTS

DE 10 2016 014 478 A1 6/2018

OTHER PUBLICATIONS

The International Search Report for the corresponding international application No. PCT/EP2018/071412, dated Oct. 9, 2018, in the German language (2 pages).
(Continued)

*Primary Examiner* — Kwasi Karikari
(74) *Attorney, Agent, or Firm* — Ronald S. Lombard

(57) ABSTRACT

A method for deactivating control channels between individual communication platforms and groups of target devices. A first control channel is realized by a first individual communication platform to a first group of target devices. A second control channel is realized by a second individual communication platform to a second group of target devices. A user can control the first group of target devices before deactivation of the control channels via a first terminal device, a universal communication platform, and the first control channel, and can control the second group of target devices via the first terminal device, the universal communication platform, and the second control channel. The user deactivate the first and second control channels by transmitting a single deactivation command from a second terminal device to the universal communication platform. The universal communication platform transmits a suitable deactivation command so that the deactivation command is understood.

7 Claims, 1 Drawing Sheet

(58) Field of Classification Search
CPC ......... H04W 4/70; H04W 4/021; H04W 4/50;
H04W 4/80; H04W 12/06; H04W 12/08;
H04W 48/08; H04W 4/02; H04W 4/023;
H04W 56/001; H04W 8/22; H04W 12/02;
H04W 12/041; H04W 12/062; H04W
12/068; H04W 12/12; H04W 12/48;
H04W 12/71; H04W 4/38; H04W 8/005
See application file for complete search history.

(56) References Cited

U.S. PATENT DOCUMENTS

| | | | |
|---|---|---|---|
| 2016/0004871 A1 | 1/2016 | Guedalia et al. | |
| 2016/0037436 A1* | 2/2016 | Spencer | H04W 12/08 370/338 |
| 2016/0226845 A1* | 8/2016 | Kim | H04L 63/062 |
| 2016/0261425 A1* | 9/2016 | Horton | H04L 12/282 |
| 2016/0320927 A1* | 11/2016 | Labranche | H04L 65/608 |
| 2017/0097619 A1* | 4/2017 | Welingkar | H04L 12/2816 |
| 2017/0208057 A1 | 7/2017 | Wang et al. | |

OTHER PUBLICATIONS

The English translation of the International Search Report for the corresponding international application No. PCT/EP2018/071412 (2 pages).

* cited by examiner

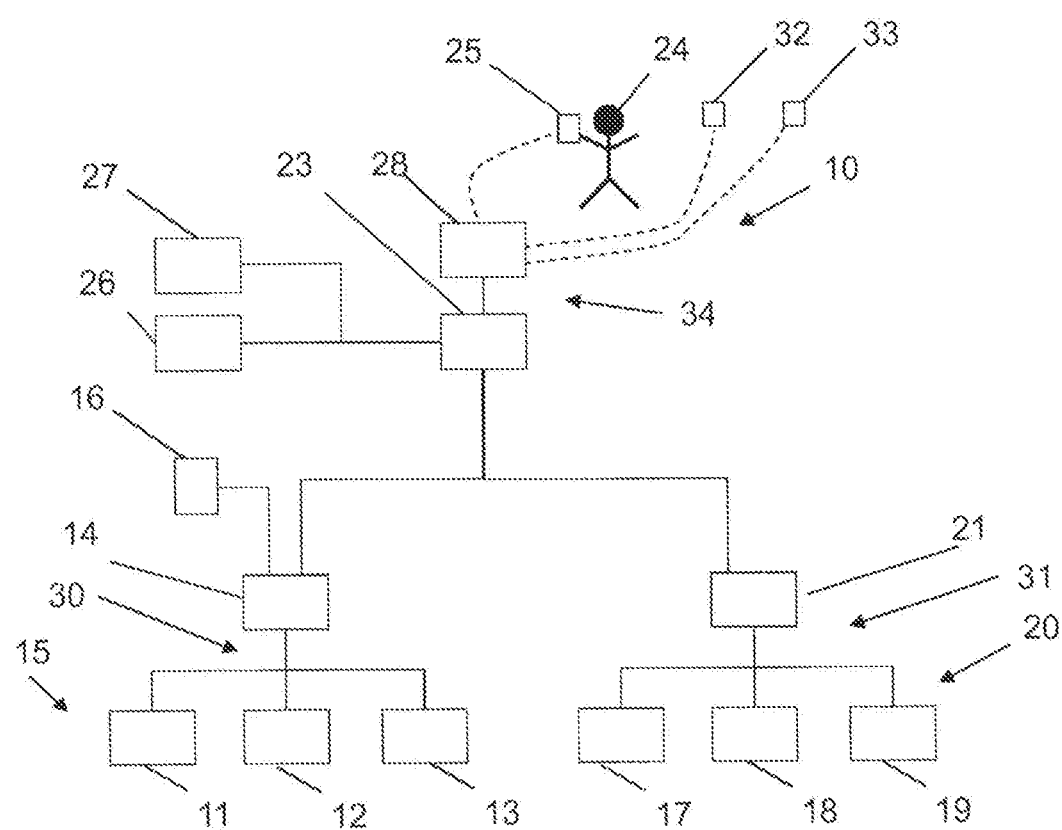

METHOD FOR DEACTIVATING CONTROL CHANNELS AND COMMUNICATION SYSTEM FOR THE COMMUNICATION OF A USER WITH GROUPS OF TARGET DEVICES

CROSS-REFERENCE TO RELATED APPLICATIONS

This is a continuation-in-part application of pending international application PCT/EP2018/071412 filed Aug. 7, 2018 and claiming the priority of German Application No. 10 2017 008 051.8 filed Aug. 27, 2017. The aforesaid pending international application PCT/EP2018/071412 and German Application No. 10 2017 008 051.8 are both incorporated herein by reference as though fully set forth.

BACKGROUND OF THE INVENTION

This invention relates to a method for deactivating control channels between individual communication platforms and groups of target devices and a communication system for communication of a user with groups of target devices with the features of the claims.

Many electronic devices for industrial, commercial and private use have an interface via which information such as status information or measured values can be read or the device can be controlled, for example activated, deactivated, or configured. Examples of this from the private sector include weather stations that measure the temperature and air quality, surveillance cameras, air conditioners, televisions, heating control systems, and refrigerators, and in the industrial sector machine tools or access systems. Such electronic devices are referred to in the following as target devices. The connection to the corresponding device can usually be established by means of special programs on a computer, a tablet computer, a smartphone, a wearable device, or another electronic device that can execute programs or apps. These electronic devices are referred to below as terminal devices. In order to be able to establish the connection, a connection to the Internet in particular is necessary, for example via a wireless connection. There are manufacturers of target devices that offer a platform that can connect to one or more of the manufacturer's target devices. Such a platform may be referred to as an individual communication platform. In order to be able to use this individual communication platform, a special program on a terminal device of a user is then in turn necessary. The information mentioned is then transmitted in a special protocol that is supported by the program used. The protocols used by the various manufacturers, which can be referred to as manufacturer protocols, differ greatly. Therefore, a user using target devices from different manufacturers to exchange information must use different terminal devices and/or different programs with different protocols. The target devices of a first manufacturer can be regarded as a first group of target devices, which can communicate with a first individual communication platform from this manufacturer using a first manufacturer protocol. Analogously, target devices from a second manufacturer can be regarded as a second group of target devices, which are able to communicate with a second individual communication platform from this manufacturer using a second manufacturer protocol.

It is known, for example from the non-prepublished German patent application of the applicant with the application number 102016014478.5 to simplify the communication of the user with terminal devices from different manufacturers in that the user communicates with a universal communication platform, which converts control commands sent by the user to a terminal device so that they are understood by the corresponding individual communication platform and so that messages of the target device, which are forwarded by the corresponding individual communication platform, are forwarded to the user in an understandable form. In order for a user to be able to use the universal communication platform, the user must be able to provide authentication to the universal communication platform. The user can do this, for example, via his terminal device. In this case, the universal communication platform forwards control commands coming from this terminal device to the target devices.

To enable a simple yet secure exchange of information between a user and a target device, the non-prepublished German Patent Application of the applicant with the application number 102016014478.5 proposes a method for assigning a target device to a user. Once this assignment is made, the user can easily communicate with a variety of target devices without having to provide authentication again. In addition to the method described in the patent application for assigning a terminal device to a user, other methods of assignment are also possible.

As soon as a terminal device is assigned to a user, the user can control a first group of target devices via his terminal device, the universal communication platform, and a first control channel realized on a first individual communication platform. Likewise, he can also control a second group of target devices via his terminal device, the universal communication platform, and a second control channel realized on second individual communication platform. The universal communication platform converts commands entered by the user for a target device in such a manner that it is "understood" by the corresponding individual communication platform.

If an unauthorized person gains access to the user's terminal device or gains access to an individual communication platform used by the user, for example if the unauthorized person gains possession of the terminal device without permission or logs on to an individual communication platform without authorization using the user's access data, then this unauthorized person will be able to control all terminal devices of the user and misuse the terminal devices.

SUMMARY OF THE INVENTION

The particular task of the invention is therefore to propose a method and a communication system by means of which control channels between individual communication platforms and groups of target devices can be quickly and easily deactivated. The task is achieved by a method and a communication system having the features of the claims. The invention relates to a method for deactivating control channels between individual communication platforms and groups of target devices. A first control channel (30) is realized by means of a first individual communication platform (14) to a first group (15) of target devices (11, 12, 13). A second control channel (31) is realized by means of a second individual communication platform (21) to a second group (20) of target devices (17, 18, 19). A user (24) can thus control the first group (15) of target devices (11, 12, 13) before deactivation of the control channels (30, 31) via a first terminal device (24), a universal communication platform (23), and the first control channel (30), and can control the second group (20) of target devices (17, 18, 19) via the first terminal device (24), the universal communication platform (23), and the second control channel (31). According to the invention, the user (24) deactivates the first and second control channels (30, 31) by transmitting a single deactivation command from a second terminal device (32) to the universal communication platform (23). The universal communication platform (23) converts the deactivation command in such a manner that the universal communication platform transmits a suitable deactivation command to each individual communication platform (14, 21) so that the deactivation command is "understood" by the corresponding individual communication platform (14, 21).

A first control channel to a first group of target devices is realized via a first individual communication platform. A second control channel to a second group of target devices is realized via a second individual communication platform. A user can thus, before deactivation of the control channels, control the first group of target devices via a first terminal device, a universal communication platform, and the first control channel, and control the second group of target devices via the first terminal device, the universal communication platform, and the second control channel.

According to the invention, the user deactivates the first and second control channels by transmitting a single deactivation command from a terminal device to the universal communication platform. If the user no longer has access to the first terminal device, then he transmits the single deactivation command from a second terminal device to the universal communication platform. If the user still has access to the first terminal device, but an unauthorized person has logged on to an individual communication platform using his access data, for example, and the user wants to deactivate all communication channels as a precaution, then he can also transmit the single deactivation command from the first terminal device to the universal communication platform.

The universal communication platform implements the deactivation command so that it transmits an appropriate deactivation command to every individual communication platform, each deactivation command of which is "understood" by the corresponding individual communication platform. Because the individual communication platforms differ greatly from each other, a different deactivation command is usually required for each individual communication platform.

A user can, by transmitting just one single deactivation command to the universal communication platform using the first or second terminal device, thus control a plurality of target devices that are controlled by different individual communication platforms. To be able to achieve this without using the method according to the invention, the user would have to log in separately to all individual communication platforms and deactivate the control of the target devices on each individual communication platform using the first or second terminal device. Firstly, this is very time consuming. Secondly, the user must enter his credentials (username and password) for each individual communication platform. Thirdly, the operation of the different individual communication platforms is not standardized, so that the user must perform deactivation in a different manner on each individual communication platform. Without using the method according to the invention, the user would need very much time for this, and in extreme cases, deactivation could be impossible because the user does not have knowledge of the credentials or there are problems with operation. Since it is possible with the first terminal device and an individual communication platform to control and even deactivate safety-critical target devices such as alarm systems, it should be possible in an emergency to deactivate the control channels between first terminal device and target devices very quickly.

The stated task is also achieved by a communication system for communication of a user with groups of target devices, in which a first control channel to a first group of target devices is realized via a first individual communication platform, and a second control channel to a second group of target devices is realized via a second individual communication platform. A user can, before deactivation of the control channels, control the first group of target devices via a terminal device, a universal communication platform, and the first control channel, and control the second group of target devices via the first terminal device, the universal communication platform, and the second control channel. According to the invention, the universal communication platform is designed so that the user can deactivate the first and second control channels by transmitting a single deactivation command from a second terminal device to the universal communication platform.

The communication between the terminal devices, the universal communication platform, the individual communication platforms, and the target devices is carried out in particular via the Internet. In particular, additional control channels can be realized via additional individual communication platforms to additional groups of target devices, which are then also deactivated by transmitting the deactivation command from the second terminal device to the universal communication platforms.

The target devices can be designed as air conditioners, weather stations, surveillance cameras, automobiles, heating control systems, refrigerators, controllers for rolling shutters, machine tools, access systems, or wearables, for example. The target devices can therefore be used as building blocks of smart home, connected car, or general Internet of Things applications, for example. Basically, all electrical, electronic, or photonic devices that have an interface for exchanging information are conceivable as target devices. A target device is connected to the Internet either directly or via a gateway.

A control channel shall be understood here as a communication link between an individual communication platform and a group of target devices, for example target devices from a particular manufacturer, via which commands can be sent to the target devices. The commands can be sent by an authorized user as described via a universal communication platform to the individual communication platform or entered directly, for example via a corresponding app on the individual communication platform. It is usually also possible for target devices to send information about the universal communication platform to the terminal device via the control channel. Communication between the user's device and the target devices is therefore possible. Communication between a terminal device of the user and a target device shall be understood here as the exchange of digital information. For example, the user could send a command to the target device to set the target temperature of an air conditioner. It is also possible that the user specifies settings on a target device, for example so that an air conditioner is switched on from Monday to Friday at 8:00 in the morning. On the other hand, the target device can send measured values such as the current temperature, status information regarding whether or not it is currently active, or acknowledgments of commands to the terminal device, for example. This type of communication is also collectively referred to using the phrase "Internet of Things" (IoT).

Deactivation of a control channel shall be understood here to mean that the described communication link between the individual communication platform and the corresponding group of target devices is interrupted, which also means the user cannot send any more commands to the target devices in the corresponding group of target devices. This applies to commands to be transmitted to the individual communication platform by the universal communication platform as well as to commands that are entered directly on the individual communication platform.

The user transmits the single deactivation command from a second terminal device, i.e. not from the first terminal device, with which he has communicated with the target devices prior to deactivation. This is necessary because it is assumed that the user no longer has access to the first terminal device. The first terminal device may be a mobile phone, for example, which is identified by the mobile phone number associated with it. The second terminal device may, for example, be another mobile phone with a different mobile phone number, a tablet computer, or a similar device. For example, the user can enter the deactivation command on one of the websites provided by the universal communication platform and to which the user can log in with his access data.

The communication platforms are in particular designed as applications or programs that are executed on a server on the Internet. In particular, the communication platforms are arranged on different servers, but it is also possible for a plurality of communication platforms to be arranged on one server.

In an embodiment of the invention, deactivation of the control channels is performed only after correct transmission of a deactivation password, which is defined beforehand by the user, to the universal communication platform. This prevents the user from accidentally deactivating the control channels as well as misuse of the deactivation function, for example the deactivation of the control channels by an unauthorized user. This enables secure deactivation of the control channels.

The deactivation password is set by the user beforehand, for example when setting up his user account on the universal communication platform. The deactivation password is stored in particular in a specially secured area of the universal communication platform and is stored in particular in encrypted form, and thus secured against unauthorized access. In particular, the universal communication platform, after receiving the deactivation command, requests the user to transmit or enter the deactivation password. If the deactivation password is not entered correctly, then the universal communication platform will not execute the deactivation command.

In an embodiment of the invention the universal communication platform, after receiving the correct deactivation password, sends a confirmation password to the user via an emergency communication channel specified beforehand by the user. The deactivation of the control channels is only carried out after the correct transmission of the confirmation password to the universal communication platform. The confirmation password is valid in particular for a limited period of time only, for example between 5 and 10 minutes. This enables particularly secure deactivation of the control channels.

The user also specifies the emergency communication channel at an earlier stage, for example when setting up his user account on the universal communication platform. A mobile connection to a mobile phone other than the first terminal device, an email connection to a specified email account, a chat app, or a communication via a social network can serve as an emergency communication channel, for example.

In an embodiment of the invention, communication between the terminal devices and the universal communication platform is performed via a communication module, which allows the use of different communication channels of the terminal devices. This enables particularly simple communication between the terminal devices and the universal communication platform.

Such a communication module is part of the universal communication platform, for example, and allows the use of various communication channels of the user's terminal devices. A communication channel of the terminal device is understood to be a program or an app installed on a terminal device for communication with other persons or services. These apps are generally used to send and receive electronic messages such as emails, text messages, WhatsApp® messages, Twitter® messages, or voice control apps. The user can also store the information necessary for communication with a target device, for example the target device contact addresses of a target device, in an address book in which he also stores the contact addresses of friends, acquaintances, or business partners.

The user can then send his commands to the universal communication platform as text. The communication module has various interface modules, each of which communicates with a terminal device via a special communication channel. The communication module converts the electronic messages received from terminal devices so that the messages can be received by the universal communication platform. In addition, the communication module converts information received from the universal communication platform into an electronic message via an interface module and the corresponding communication channel so the information can be sent to a terminal device, and thus to the user.

The communication module and the universal communication platform are designed in particular so that the user can specify a preferred communication channel. For example, the user can specify that messages such as alerts or notifications from target devices are always sent via a specific communication channel, for example as a text message, to his terminal device. The settings can apply to all target devices, to individual groups of target devices, or to individual target devices.

The selection of a preferred method of communication can be carried out, for example, as described in DE 102011117777 B3.

To ensure the user does not have to adhere to predefined terms when entering commands for the target devices and can instead formulate the commands as free text, for example "Turn on air conditioning in room 225", the universal communication platform is connected in particular to a first knowledge base and a second knowledge base. In this case, the universal communication platform sends the user's input to the knowledge bases, which then interpret the input and thus attempt to recognize the intention of the user and return it to the individual communication platform. In the example above, this input could be "Activate air conditioning room 225", for example.

It is also possible that the universal communication platform has communication links to more than two, only one, or not to any knowledge base. If no knowledge base is used, then the user must adhere to defined commands stored in the universal communication platform.

In an embodiment of the invention, in addition to the control channels between the individual communication platforms and groups of target devices, a main control channel between the first terminal device of the user and the universal communication platform is also deactivated. This enables particularly effective prevention of the misuse of the first terminal device of the user.

In an embodiment of the invention, the universal communication platform forwards confirmations from the individual communication platforms to the user via the deactivation of the control channels. In particular, in the case where the universal communication platform does not receive confirmation of the deactivation of the control channels from an individual communication platform, the universal communication platform informs the user of this. This provides the user with a good overview of which cases the deactivation of the control channels was successful and which cases were unsuccessful.

The universal communication platform provides the user with this information in such a manner that he can receive this information with a terminal device other than the first terminal device. The universal communication platform can, for example, send the information to the user via the emergency communication channel mentioned above.

The universal communication platform can also provide the user with the contact information of the individual communication platforms, for example the emergency telephone numbers of the individual manufacturers, via which the user may also deactivate the control channels or request the status of the deactivation.

If an individual communication platform does not offer the described capability to deactivate the relevant control channel, but instead offers a contact address, for example an email address, then the universal communication platform can inform the individual communication platform using this contact address that the user wants to deactivate the relevant control channel.

BRIEF DESCRIPTION OF THE DRAWING

Further embodiments of the invention will become apparent from the description and the sole drawing FIGURE. Embodiments of the invention are shown in simplified form in the sole drawing FIGURE and explained in more detail in the following description. In this case, The sole drawing FIGURE shows a communication system, by means of which a user can control groups of target devices via control channels.

DETAILED DESCRIPTION OF THE PARTICULAR EMBODIMENTS

According to the sole drawing FIGURE, in a communication system 10 the target devices 11, 12, 13 are connected to a first individual communication platform 14 via a communication link to the Internet. The target devices 11, 12, 13 thus form a first group 15 of target devices and can therefore be referred to as first target devices. What they have in common is that they all come from the same first manufacturer. The communication between the first individual communication platform 14 and the target devices 11, 12, 13 is performed by means of a first target device protocol, which is specified by the first manufacturer. The first manufacturer also provides a program, referred to as app 16, which can communicate via the Internet with the first communication platform 14, and thus with the target devices 11, 12, 13 of the first group 15 of target devices. Communication between the app 16 and the first individual communication platform 14 is performed in this case via a first specific terminal device protocol.

Target devices 17, 18, 19 form a second group 20 of target devices and communicate with a second individual communication platform 21 via the Internet communication link. The target devices 17, 18, 19 can be referred to as second target devices. The target devices 17, 18, 19 of the second group 20 of target devices all originate from the same second manufacturer, who specifies a second target device protocol, which differs from the first target device protocol, for the communication between the second individual communication platform 21 and the target devices 17, 18, 19. The second manufacturer does not provide an app that can communicate via the Internet with the second communication platform 21, and thus with the target devices 17, 18, 19 of the second group 20 of target devices. The second individual communication platform 21, however, is designed so that it can be communicated with using a second specific terminal device protocol, which differs from the first specific terminal device protocol.

The manufacturer-specific app 16 can be executed, for example, on a mobile terminal device, for example in the form of a smartphone of a user.

The two individual communication platforms 14, 21 can send commands, for example a command to switch on an air conditioner, to the target devices assigned to them. They can also receive information from their corresponding target devices, particularly measured values, such as a temperature measurement or status messages, such as the current operating state of a target device.

The target devices can be used, for example, as air conditioners, weather stations, surveillance cameras, cars, heating control systems, refrigerators, controls for rolling shutters, machine tools, or access systems The first individual communication platform 14 and the second individual communication platform 21 are connected to a universal communication platform 23 via the Internet. To make this communication possible, the manufacturers of the respective target devices or the operators of the respective individual communication platform 14, 21 each provide a programming interface, which is used by the universal communication platform 23. The universal communication platform 23 thus communicates with the first individual communication platform 14 using the first terminal device protocol and with the second individual communication platform 21 using the second terminal device protocol. The universal communication platform 23 can thus communicate via the associated universal communication platform 14, 21 with the target devices 11, 12, 13 of the first group 15 as well as with the target devices 17, 18, 19 of the second group 20.

A user 24 is connected to the universal communication platform 23 via a first mobile device 25, such as a smartphone, and to the Internet via a communication module 28. The user 24 can thus communicate with the target devices 11, 12, 13 of the first group 15 of target devices via the first terminal device 25, the communication module 28, the universal communication platform 23, and the first individual communication platform 14, and with the target devices 17, 18, 19 of the second group 20 of target devices via the first terminal device 25, the communication module 28, the universal communication platform 23, and the second individual communication platform 21, and can thus control the target devices 11, 12, 13, 17, 18, 19.

The communication system 10 thus has a first control channel 30, which extends to the first group 15 of target devices 11, 12, 13, through the first terminal device 25 of the user 24, the communication module 28, the universal communication platform 23, and the first individual communication platform 14. The first control channel 30 to the first group 15 of target devices 11, 12, 13 is thus realized via the first individual communication platform 14.

The communication system 10 also has a second control channel 31, which extends to the second group 20 of target devices 17, 18, 19, through the first terminal device 25 of the user 24, the communication module 28, the universal communication platform 23 and the second individual communication platform 21. The second control channel 31 to the second group 20 of target devices 17, 18, 19 is thus implemented via the second individual communication platform 21.

In addition, the communication system 10 has a main control channel 34 extending between the first terminal device 25 and the universal communication platform 23.

The communication platforms 14, 21, 23 are implemented as applications or programs, which are executed on a server on the Internet. In particular, the communication platforms are arranged on different servers, but it is also possible for a plurality of communication platforms to be arranged on one server.

The communication module 28 allows the use of different communication channels of the terminal device 25. A communication channel of the terminal device is understood to mean the use of a program or app installed on the first terminal device 25 for communication with other persons or services. These apps are generally used to send and receive electronic messages such as emails, text messages, WhatsApp® messages, Twitter® messages, or voice control apps. The user 24 can thus store the information necessary for communication with a target device 11, 12, 13, 17, 18, 19, which is also referred to as the target device contact addresses of a target device, in an address book in which he also stores the contact addresses of friends, acquaintances, or business partners.

The user 24 sends his commands to the universal communication platform 23 as free text. The communication module 28 has various interface modules, not shown, each of which enables communication with the first terminal device 25 via a special communication channel. The communication module 28 converts the electronic messages received from the first terminal device 25 so that they can be received by the universal communication platform 23. It also converts information received from the universal communication platform 23 so that they can be sent as an electronic message via an interface module and the associated communication channel to the first terminal device 25, and thus to the user.

The communication module 28 and the universal communication platform 23 are designed so that the user 24 can specify a preferred communication channel. For example, the user 24 can specify that messages such as alerts or notifications from target devices are always sent via a specific communication channel, for example as text messages, to the first terminal device 25. The settings can apply to all target devices 11, 12, 13, 17, 18, 19 or also be specified for individual groups of target devices or individual target devices.

To ensure the user 24 does not have to adhere to predefined terms when entering commands for the target devices 11, 12, 13, 17, 18, 19 and can instead formulate the commands as free text, for example "Turn on air conditioning in room 225", the universal communication platform 23 is connected via the Internet to a first knowledge database 26 and a second knowledge database 27. The universal communication platform 23 sends the user's 24 input to the knowledge databases 26, 27, which then interpret the input and thus attempt to recognize the intention of the user 24 and return it to the individual communication platform 23. In the example above, this input could be "Activate air conditioning room 225", for example. In addition to the derived intention, the knowledge databases 26, 27 also provide a hit probability. This indicates the probability with which the stated intention corresponds to the actual intention of the user 24. In the event the information returned differs, the universal communication platform 23 assumes the intention with the higher hit probability. If the hit probabilities of both knowledge databases 26, 27 are below a limit value of 75%, for example, then the universal communication platform 23 sends a request back to the user 24. In particular, this request is formulated in such a manner that it asks if the derived intention with the higher hit probability is correct.

Names of the individual target devices 11, 12, 13, 17, 18, 19 are stored in the universal communication platform 23. For example, it can store the information that the air conditioner in room 225 corresponds to target device 11. In this manner, a command entered by the user 24 and recognized by one of the knowledge databases 26, 27 can be sent to the correct target device.

It is also possible that the universal communication platform has communication links to more than two, only one, or not to any knowledge base. If no knowledge base is used, then the user must adhere to defined commands stored in the universal communication platform.

In order for a user 24 to be able to communicate with one of the target devices 11, 12, 13, 17, 18, 19 via his first terminal device 25, the corresponding target device must be assigned to the user 24. The assignment can be made, for example, according to the following description. There are also other ways, though, to make the assignment.

For example, to assign the target device 11 to the user 24, the target device 11 is first connected to the Internet. A sticker with a QR code is attached to the target device 11. The QR code contains an address of a web page, for example "www.xyz.com/1234567". This unique web page is uniquely assigned to the target device 11. As soon as the user 24 scans the QR code with the first terminal device 25, the web page is opened in the Internet browser of the first terminal device 25.

This web page is provided by the universal communication platform 23. The universal communication platform 23 first checks if the target device assigned to the web page, i.e. the target device 11 in the example, is currently not assigned to any user. If this is the case, then the universal communication platform 23 first requests the user 24 to enter one or more user contact addresses for one or more communication channels via the Internet page. In particular, the user can be directed to a special website on which the information can be entered. This can prevent the information from being stored on the terminal device in a history log. The user 24 may, for example, enter his telephone number for text messages or WhatsApp® messages, or he can enter his email address. Once the user 24 has entered the user contact addresses, the universal communication platform 23 provides target device contact addresses on the web page for the communication channels for which the user has entered user contact addresses. The target device contact addresses are displayed on the web page for this purpose. In addition, a digital business card in the form of a vCard, which contains the target device contact addresses, is offered for download. Downloading the vCard allows the user 24 to store the target device contact addresses in the address book on the first terminal device 25. The user 24 also has the ability to select a preferred communication channel, for example a text message service, via which communication with the target device 11 should be performed by default.

Information about the target device 11 is stored on the universal communication platform 23. The manufacturer, the model, and a serial number may be stored, for example. The universal communication platform 23 therefore knows that the target device 11 comes from the first manufacturer, who operates the first individual communication platform 14. In this first individual communication platform 14, an authorization code associated with the target device 11 is stored in the form of a token. The token consists, for example, of a 16-20 digit code comprising numbers and letters. As soon as the user 24 has entered at least one user contact address on the Internet page, the universal communication platform 23 requests the token of the target device 11 from the first individual communication platform 14 and displays the token on the Internet page.

Upon display of the token on the Internet page, the universal communication platform 23 requests the user 24 to send an electronic message to the target device, meaning one of the target device contact addresses, via one of the communication channels for which the user has specified a user contact address. The electronic message must contain the token. In addition, the user 24 can also assign a name to the target device 11. The electronic message is received and evaluated by the universal communication platform 23. If the electronic message contains the corresponding user contact address as the sender and contains the correct token, then the electronic message is determined to have been received correctly, and the universal communication platform 23 assigns the target device 11 to the user 24. From this point on, the user 24 can communicate with the target device 11 via the first terminal device 25 and control it.

In this manner, the user 24 can assign all target devices 11, 12, 13, 17, 18, 19 and control them. The user can therefore control the first group 15 of target devices 11, 12, 13 via the first terminal device 25, the universal communication platform 23, and the first control channel 30, and control the second group 20 of target devices 17, 18, 19 via the first terminal device 25, the universal communication platform 23, and the second control channel 31.

The user 24 has the ability to deactivate the first and second control channel 30, 31 by transmitting a single deactivation command from a second terminal device 32 to the universal communication platform 23. This may be necessary, for example, when someone gains unauthorized access to the first terminal device 25 of the user 24, for example in case it has been stolen. In this case, it is important to be able to deactivate the control of the target devices 11, 12, 13, 17, 18, 19 as quickly as possible. If the user 24 still has access to the first terminal device 25 and nevertheless wants to deactivate the first and second control channels 30, 31, then transmission of the single deactivation command can also be carried out using the first terminal device 25.

For this purpose, the user 24 must specify a deactivation password, which is stored by the universal communication platform 23 in a particularly secure area, when logging in to the universal communication platform 23. Logging in to the universal communication platform 23 allows the user 24 to communicate with the universal communication platform 23 using different devices. The user 24 only needs to specify access data in the form of a user ID and password, which can also be stored in the terminal devices so that they do not have to be entered every time before establishing communication.

The user can therefore still communicate with the universal communication platform 23 even after losing the first terminal device 25, for example using a second terminal device 32. The user 24 can use different communication channels for this purpose as described above, for example to send a text message to the universal communication platform 23. The universal communication platform 23 provides in particular a special emergency number, which is also published on the Internet. The deactivation of the control channels can then be requested by sending the special deactivation command, for example, to the emergency number.

After receiving the deactivation command, the universal communication platform 23 sends a request to enter the specified deactivation password to the second terminal device 32. If the user 24 has entered the correct deactivation password and the deactivation password was transmitted correctly to the universal communication platform 23, then the universal communication platform 23 transmits a confirmation password to the user 24 via an emergency communication channel specified beforehand by the user 24. The emergency communication channel is also specified by the user 24 when logging in to the universal communication platform 23. The emergency communication channel can be specified by user 24 in that the confirmation password should be sent in a text message to a third terminal device 33, for example. Since the confirmation password is only valid for a limited period of time, for example between 5 and 10 minutes, the user 24 must transmit the confirmation password to the universal communication platform 23 within this time period in order to proceed with the deactivation of the control channels.

If all passwords have been transmitted correctly to the universal communication platform 23, then the universal communication platform 23 asks again if the user 24 really wants to deactivate the control channels. If this query is answered by the user 24 with "Yes", then the universal communication platform 23 sends a command to the first and the second individual communication platform 14, 21 to disconnect the communication links between the universal communication platforms 14, 21 and the associated target devices 11, 12, 13, 17, 18, 19. Both control channels 30, 31 are then deactivated.

In addition, the main control channel 34 between the first terminal device 25 and the universal communication platform 23 is deactivated. Thus, no communication between the first terminal device 25 and the universal communication platform 23 can take place anymore.

Some individual communication platforms send confirmation messages to the universal communication platform 23 regarding the deactivation of the communication link to the target devices. The universal communication platform 23 forwards the confirmations of these individual communication platforms to the second terminal device 32, and therefore to the user 24. The universal communication platform 23 also informs the user 24 when it does not receive confirmation of the deactivation of the control channels from an individual communication platform 14, 21.

The universal communication platform 23 also provides the user 24 with the contact information of the individual communication platforms 14, 21, for example the emergency telephone numbers of the individual manufacturers, via which the user 24 may also deactivate the control channels or request the status of deactivation.

If an individual communication platform does not offer the described capability to deactivate the relevant control channel, but instead offers a contact address, for example an email address, then the universal communication platform can inform the individual communication platform using this contact address that the user wants to deactivate the relevant control channel.

What is claimed is:

1. A method for deactivating control channels (30, 31) between individual communication platforms (14, 21) and groups (15, 20) of target devices (11, 12, 13, 17, 18, 19), said method comprising the following steps:

a first control channel (30) to a first group (15) of target devices (11, 12, 13) is realized via a first individual communication platform (14), a second control channel (31) to a second group (20) of target devices (17, 18, 19) is realized via a second individual communication platform (21), before deactivation of the control channels (30, 31), a user (24) can control the first group (15) of target devices (11, 12, 13) via a first terminal device (25), a universal communication platform (23), and the first control channel (30), and control the second group (20) of target devices (17, 18, 19) via the first terminal device (25), the universal communication platform (23), and the second control channel (31), the user (24) deactivates the first control channel (30) and the second control channel (31) by transmitting a single deactivation command from a terminal device (25, 32, 33) to the universal communication platform (23), the control channels (30, 31) are only deactivated after a user-defined (24) deactivation password is transmitted correctly to the universal communication platform (23), and, the universal communication platform (23), after receiving the correct deactivation password, sends a confirmation password to the user (24) via an emergency communication channel previously specified by the user (24) and deactivates the control channels (30, 31) only after correct transmission of the confirmation password to the universal communication platform (23).

2. The method according to claim 1, further comprising the confirmation password is only valid for a limited period of time.

3. The method according to claim 1, further comprising the communication between the terminal devices (25, 32, 33) and the universal communication platform (23) is performed via a communication module (28), which allows the use of different communication channels of the terminal devices (25, 32, 33).

4. The method according to claim 1, further comprising a main control channel (34) between the first terminal (25) of the user (24) and the universal communication platform (23) is deactivated in addition to the control channels (30, 31) between the individual communication platforms (14, 21) and groups (15, 20) of target devices (11, 12, 13, 17, 18, 19).

5. The method according to claim 1, further comprising the universal communication platform (23) forwards confirmations of the deactivation of the control channels (30, 31) from the individual communication platforms (14, 21) to the user (24).

6. A method for deactivating control channels (30, 31) between individual communication platforms (14, 21) and groups (15, 20) of target devices (11, 12, 13, 17, 18, 19), said method comprising the following steps:

a first control channel (30) to a first group (15) of target devices (11, 12, 13) is realized via a first individual communication platform (14), a second control channel (31) to a second group (20) of target devices (17, 18, 19) is realized via a second individual communication platform (21), before deactivation of the control channels (30, 31), a user (24) can control the first group (15) of target devices (11, 12, 13) via a first terminal device (25), a universal communication platform (23), and the first control channel (30), and control the second group (20) of target devices (17, 18, 19) via the first terminal device (25), the universal communication platform (23), and the second control channel (31), the user (24) deactivates the first control channel (30) and the second control channel (31) by transmitting a single deactivation command from a terminal device (25, 32, 33) to the universal communication platform (23), the universal communication platform (23) forwards confirmations of the deactivation of the control channels (30, 31) from the individual communication platforms (14, 21) to the user (24), and, in the event the universal communication platform (23) does not receive confirmation of the deactivation of the control channels (30, 31) from an individual communication platform (14, 21), the universal communication platform (23) informs the user (24) of this.

7. A communication system for communication of a user (24) with groups (15, 20) of target devices (11, 12, 13, 17, 18, 19), comprising:

a first control channel (30) to a first group (15) of target devices (11, 12, 13) is realized via a first individual communication platform (14), a second control channel (31) to a second group (20) of target devices (17, 18, 19) is realized via a second individual communication platform (21), before deactivation of the control channels (30, 31), a user (24) can control the first group (15) of target devices (11, 12, 13) via a first terminal device (25), a universal communication platform (23), and the first control channel (30), and control the second group (20) of target devices (17, 18, 19) via the first terminal device (25), the universal communication platform (23), and the second control channel (31), and the universal communication platform (23) is designed so that the user (24) can deactivate the first control channel (30) and the second control channel (31) by transmitting a single deactivation command from a terminal device (25, 32) to the universal communication platform (23), wherein the control channels (30, 31) are only deactivated after a user-defined (24) deactivation password is transmitted correctly to the universal communication platform (23), and, the universal communication platform (23), after receiving the correct deactivation password, sends a confirmation password to the user (24) via an emergency communication channel previously specified by the user (24) and deactivates the control channels (30, 31) only after correct transmission of the confirmation password to the universal communication platform (23), and/or, the universal communication platform (23) forwards confirmations of the deactivation of the control channels (30, 31) from the individual communication platforms (14, 21) to the user (24), and, in the event the universal communication platform (23) does not receive confirmation of the deactivation of the control channels (30, 31) from an individual communication platform (14,

21), the universal communication platform (23) informs the user (24) of this.

* * * * *